May 5, 1959 — R. F. CROW — 2,884,973
CUTTER AND FEEDER FOR A POTATO PLANTER
Filed Oct. 18, 1957 — 2 Sheets-Sheet 1
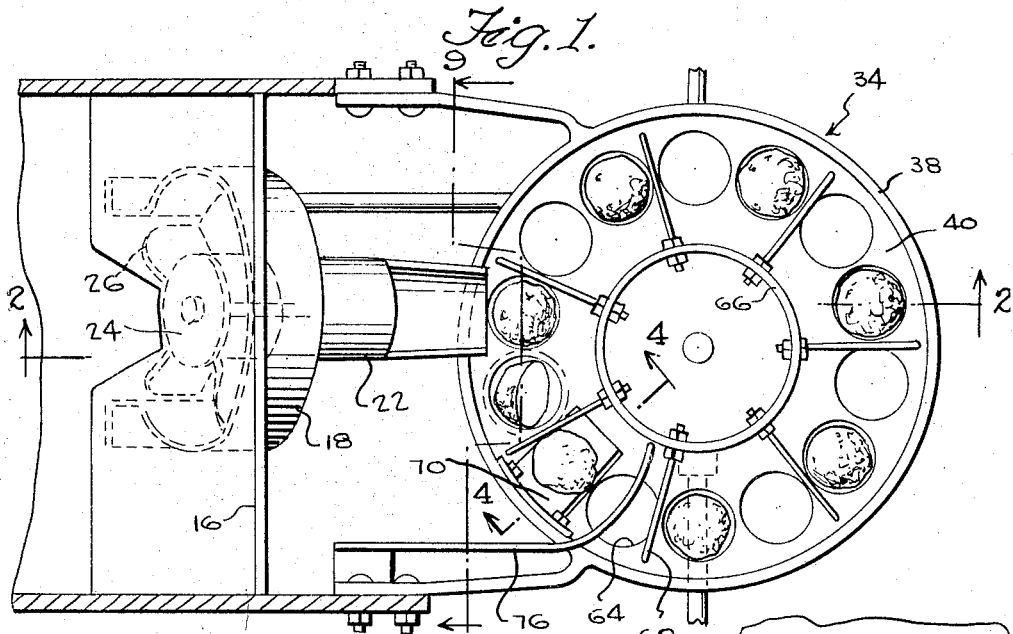
INVENTOR.
Robert F. Crow
BY McMorrow, Berman & Davidson
ATTORNEYS May 5, 1959 R. F. CROW 2,884,973
CUTTER AND FEEDER FOR A POTATO PLANTER
Filed Oct. 18, 1957 2 Sheets-Sheet 2
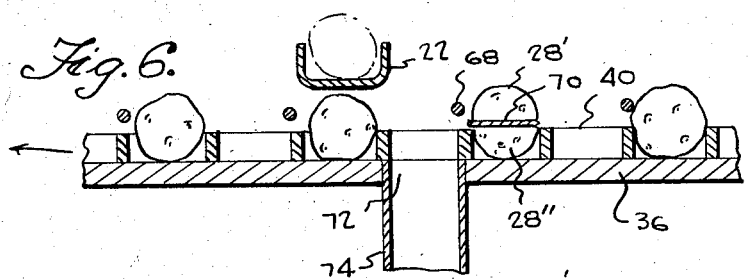
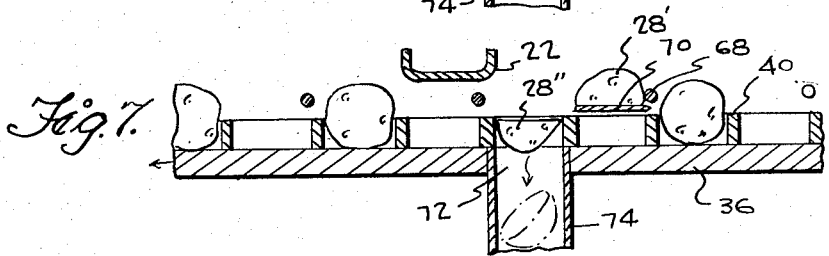
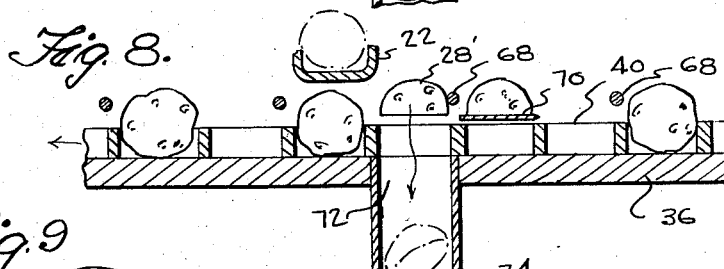
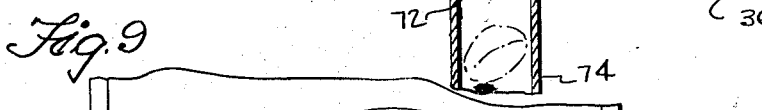
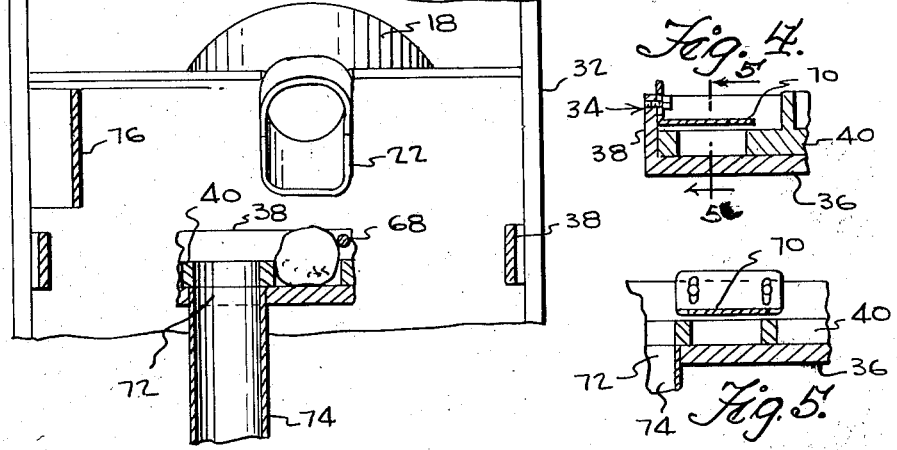
INVENTOR.
Robert F. Crow
BY
ATTORNEYS

2,884,973

CUTTER AND FEEDER FOR A POTATO PLANTER

Robert F. Crow, Del Norte, Colo.

Application October 18, 1957, Serial No. 691,068

3 Claims. (Cl. 146—59)

The present invention relates to a cutter and feeder for a potato planter.

An object of the present invention is to provide a cutter and feeder for a potato planter which lends itself to efficient and automatic operation requiring a minimum of attention.

Another object of the present invention is to provide a cutter and feeder for a potato planter which is simple in structure and economical to manufacture and assemble, and one which is highly effective in action.

These and other objects and advantages of the present invention will be fully apparent from the following description when taken in connection with the annexed drawings, in which:

Figure 1 is a plan view of the cutter and feeder according to the present invention;

Figure 2 is a sectional view taken on the line 2—2 of Figure 1;

Figure 3 is a fragmentary sectional view taken on the line 3—3 of Figure 2;

Figure 4 is a fragmentary sectional view taken on the line 4—4 of Figure 1;

Figure 5 is a sectional view taken on the line 5—5 of Figure 4;

Figure 6 is a schematic view showing a step in the operation of the cutter and feeder of the present invention;

Figure 7 is a schematic view showing a second step;

Figure 8 is a further schematic view showing a third and final step in the operation of the cutter and feeder of the present invention;

Figure 9 is a fragmentary sectional view taken on the line 9—9 of Figure 1; and

Figure 10 is an isometric schematic view of the gear train used to drive the cutter and feeder mechanism of the present invention.

Referring in greater detail to the drawings in which like numerals indicate like parts throughout the several views, the cutter and feeder of the present invention comprises an open top hopper 12 having a sloping front wall 14 and a sloping rear wall 16 and a housing 18 positioned rearwardly of the rear wall 16 with its lower end in communication with a discharge opening 20 provided in the hopper rear wall 16. A chute 22 is disposed adjacent the upper end of the housing 18 and a feeding means is interposed between the discharge opening 20 of the hopper 12 and the chute 22 for delivering potatoes individually in turn from the hopper 12 to the chute 22. Specifically, this feeding means consists in a wheel 24 having radially arranged blades 26 (Figures 2 and 3) adapted to engage a potato 28 as the latter is received through the discharge opening 20 and carry the same upwardly to the upper end of the chute 22. The wheel 24 is mounted for rotation on the upper end of a shaft 30 which extends through the rear wall of the housing 18.

The hopper 12 is supported upon the frame 32 of the planter and the frame 32 carries, rearwardly of the hopper 12, a horizontally disposed shallow receptacle 34 including a floor 36 and an upstanding wall 38 extending about the perimeter of the floor 36. A disc 40 is positioned within the receptacle 34 so that one face is adjacent the floor 36. The disc 40 is mounted upon the upper end portion of a shaft 42 journaled in a shaft housing 44 which is carried upon the underface of the floor 36 of the receptacle 34. The lower end of the shaft 42 carries a bevel gear 46 in mesh with a second bevel gear 48 mounted upon a cross shaft 50, as seen in Figure 10. Another bevel gear 52 on the cross shaft 50 is in mesh with a fourth bevel gear 54 carried on the lower end of a driven shaft 56. A spur gear 58 is carried on the upper end of the driven shaft 56 and is in mesh with a second spur gear 60 carried on the lower end of the shaft 30. Suitable drive means for the shaft 50 is provided and may take the form of a drive chain 62 mounted upon a suitable sprocket carried by the shaft 50, the chain 62 being connected to a power source such as the drive axle of the planter, the drive axle not being shown since it forms no part of the present invention.

The disc 40 is provided with a plurality of apertures 64 arranged in a circle adjacent the periphery of the disc 40, each aperture 64 being of an area to freely accommodate a whole potato 28 and forming with the receptacle floor 36 a pocket. The upper face of the disc 40 is spaced below the upper end of the receptacle wall 38. A collar 66 rises from the portion of the disc 40 inwardly of the circle of apertures 64 and a plurality of pusher bars are arranged exteriorly of and fixedly project in radial spaced relation from the collar 66, the pusher bars being designated by the reference numeral 68.

All of the pusher bars 68 lie in a common horizontal plane between the upper face of the disc 40 and the upper end of the receptacle wall 38. The pusher bars 68 are spaced from each other so that two apertures 64 in the disc 40 are between adjacent bars 68, as shown most clearly in Figure 1.

A horizontally disposed flat knife blade 70 is positioned between the collar 66 and the receptacle wall 38 and is fixedly secured to the receptacle wall 38. The blade 70 is arranged at a level between the upper face of the disc 40 and the plane of the bars 68. The blade 70 is of an area such as to completely cover each of the apertures 64 in the disc 40 in turn when the disc 40 is rotated.

The receptacle floor 36 is provided with a discharge opening 72 located beyond the blade 70 a distance equal to the distance between the apertures 64 in the disc 40 and in registry in turn with each of the apertures 64 in the disc 40 when the latter is rotated. The discharge opening 72 leads to the planting chute 74 of the planter, of conventional construction and shown only in partial cross-sectional view in Figure 9.

In Figures 6 to 8 is shown the sequence of operation of the cutter and feeder mechanism. In Figure 6 the knife blade 70 has severed a potato 28 into two parts, an upper part and a lower part, designated by the reference numeral 28′ and 28″, respectively. The disc 40 moves in the direction indicated by the arrow and in Figure 7 the disc 40 has moved to the position in which the potato lower part 28″ is free to drop into the chute 74 through the discharge opening 72 in the receptacle floor 36.

The potato upper part 28′ is shown in Figure 7 resting upon the knife blade 70. Upon further rotation of the disc 40, as shown in Figure 8, the adjacent pusher bar 68 is shown having moved the potato upper half 28′ off of the blade 70 and into registry with the discharge opening 72 and the chute 74. At the same time the following potato has been cut by the blade 70 and the sequence of operation will be repeated for each potato 28 delivered into alternate apertures or pockets 64 in the disc 40.

A shield 76 projects from the planter frame 32 at a position forwardly of the blade 70 and at a height such that the potatoes 28 pass through thereunder as the disc 40 is rotated.

It is an important feature of the present invention that the gear chain, shown in Figure 10, operate to rotate the wheel 24 at a speed which will deliver one potato 28 to every other aperture or pocket 64 in the disc 40.

In operation, as the potatoes 28 are fed to the chute 22 by the wheel 24, the potatoes 28 fall into alternate apertures or pockets 64 in the disc 40 and are carried by the disc 40 in the clockwise direction (Figure 1) to a point where the blade 70 severs the potato into two more or less equal sized halves. One half of the potato will stay on the blade 70 until the following pusher bar 68 moves the potato half off of the blade 70 and into the adjacent empty aperture 64 which is then in registry with the discharge opening 72 and the planter chute 74. Very little attention is needed to keep the potatoes in the alternate apertures and the attention of an operator is only necessary to see that the potatoes flow freely from the hopper 12 through the discharge opening in the rear wall of the hopper 12.

While only a preferred embodiment of the present invention has been shown and described, other embodiments are contemplated and numerous changes and modifications may be made therein without departing from the spirit of the invention as set forth in the appended claims.

What is claimed is:

1. In a potato planter, a shallow receptacle including a floor and an upstanding wall extending about the perimeter of said floor, a disc positioned within said receptacle so that one face is adjacent said floor and rotatable about a vertical axis, there being in said disc a plurality of apertures arranged in a circle adjacent the periphery thereof, each aperture being of an area to freely accommodate a whole potato and forming with the receptacle floor a pocket, the other face of said disc being below and spaced from the upper end of said receptacle wall, an upstanding collar rising from the portion of said disc inwardly of said circle of apertures, a plurality of pusher bars arranged exteriorly of and fixedly projecting in radial spaced relation from said collar, all of said bars lying in a common horizontal plane between the other face of said disc and the upper end of said receptacle wall, the spacing between adjacent bars being such that two apertures of said disc are therebetween, means associated with said disc for feeding a potato only into the first pocket of each pair of pockets, and a horizontally disposed knife blade positioned between said collar and the receptacle wall and fixedly carried by the latter wall, said blade being arranged at a level between the other face of said disc and the plane of said bars and being of an area to completely cover each of said disc apertures, said floor being provided with a discharge opening located beyond said blade a distance equal to the distance between the apertures in the disc and registrable in turn with each of said disc apertures as the disc is rotated.

2. In a potato planter, a shallow receptacle including a floor and an upstanding wall extending about the perimeter of said floor, a disc positioned within said receptacle so that one face is adjacent said floor and rotatable about a vertical axis, there being in said disc a plurality of apertures arranged in a circle adjacent the periphery thereof, each aperture being of an area to freely accommodate a whole potato and forming with the receptacle floor a pocket, the other face of said disc being below and spaced from the upper end of said receptacle wall, an upstanding collar rising from the portion of said disc inwardly of said circle of apertures, a plurality of pusher bars arranged exteriorly of and fixedly projecting in radial spaced relation from said collar, all of said bars lying in a common horizontal plane between the other face of said disc and the upper end of said receptacle wall, the spacing between adjacent bars being such that two apertures of said disc are therebetween, means associated with said disc for feeding a potato only into the first pocket of each pair of pockets, a horizontally disposed knife blade positioned between said collar and the receptacle wall and fixedly carried by the latter wall, said blade being arranged at a level between the other face of said disc and the plane of said bars and being of an area to completely cover each of said disc apertures, said floor being provided with a discharge opening located beyond said blade a distance equal to the distance between the apertures in the disc and registrable in turn with each of said disc apertures as the disc is rotated, and a chute disposed adjacent the upper end of said receptacle wall for delivery in turn potatoes to the respective pockets as the disc is rotated.

3. In a potato planter, a shallow receptacle including a floor and an upstanding wall extending about the perimeter of said floor, a disc positioned within said receptacle so that one face is adjacent said floor and rotatable about a vertical axis, there being in said disc a plurality of apertures arranged in a circle adjacent the periphery thereof, each aperture being of an area to freely accommodate a whole potato and forming with the receptacle floor a pocket, the other face of said disc being below and spaced from the upper end of said receptacle wall, an upstanding collar rising from the portion of said disc inwardly of said circle of apertures, a plurality of pusher bars arranged exteriorly of and fixedly projecting in radial spaced relation from said collar, all of said bars lying in a common horizontal plane between the other face of said disc and the upper end of said receptacle wall, the spacing between adjacent bars being such that two apertures of said disc are therebetween, means associated with said disc for feeding a potato only into the first pocket of each pair of pockets, a horizontally disposed knife blade positioned between said collar and the receptacle wall and fixedly carried by the latter wall, said blade being arranged at a level between the other face of said disc and the plane of said bars and being of an area to completely cover each of said disc apertures, said floor being provided with a discharge opening located beyond said blade a distance equal to the distance between the apertures in the disc and registrable in turn with each of said disc apertures as the disc is rotated, a chute disposed adjacent the upper end of said receptacle wall for delivering in turn potatoes to the respective pockets as the disc is rotated, a hopper adapted to contain a supply of whole potatoes to be treated, and feeding means interposed between said hopper and said chute for delivering potatoes individually in turn from said hopper to said chute.

References Cited in the file of this patent

UNITED STATES PATENTS

| | | |
|---|---|---|
| 543,168 | Bordner | July 23, 1895 |
| 1,515,049 | Jenkins | Nov. 11, 1924 |